United States Patent [19]

Düwelshöft

[11] Patent Number: 4,483,504
[45] Date of Patent: Nov. 20, 1984

[54] SLIDE RAIL ASSEMBLIES

[75] Inventor: Helmut Düwelshöft, Stadthagen, Fed. Rep. of Germany

[73] Assignee: P. A. Rentrop Hubbert & Wagner Fahrzeugausstattunger GmbH & Co. KG, Stadthagen, Fed. Rep. of Germany

[21] Appl. No.: 333,258

[22] Filed: Dec. 22, 1981

[30] Foreign Application Priority Data

Dec. 27, 1980 [DE] Fed. Rep. of Germany ....... 3049241

[51] Int. Cl.³ ........................................... F16M 13/00
[52] U.S. Cl. ..................................... 248/429; 248/393
[58] Field of Search ............... 248/393, 394, 395, 396, 248/429, 430, 424; 296/65 R; 297/330, 344, 346

[56] References Cited

U.S. PATENT DOCUMENTS 2,612,208 9/1952 Rhodes ............................. 248/430
2,921,621 1/1960 Williams et al. ................ 248/430 X
4,040,591 8/1977 Pickles ............................. 248/394

FOREIGN PATENT DOCUMENTS 785412 10/1957 United Kingdom .
1160182 7/1969 United Kingdom .
1279620 6/1972 United Kingdom .
1465957 3/1977 United Kingdom .
2013771 8/1979 United Kingdom ............... 248/430
1576170 10/1980 United Kingdom .

Primary Examiner—J. Franklin Foss
Attorney, Agent, or Firm—Penrose Lucas Albright

[57] ABSTRACT

A vehicle seat (see FIG.1) is slidably supported by two pairs of slide rails, each rail of each pair having the same cross-section. For both pairs each rail (1,2) includes a U-shaped portion and an offset flange. The flange of one rail (2) engages in the U-shaped portion of the other rail and vice versa. Ball bearings may be accommodated in a space between the two rails and a locking latch may be provided to lock the rails of one pair with respect to one another.

The two rails are thus double interlocked so as to resist separation for example in the event of a road accident. Also expense is reduced because the two rails are of similar cross-section.

9 Claims, 5 Drawing Figures

SLIDE RAIL ASSEMBLIES

BACKGROUND OF THE INVENTION

1. Field of the invention

The present invention relates to slide rail assemblies for vehicle seats, for example.

2. Description of the prior art

In previously proposed slide rail assemblies two pairs of guide rails are arranged parallel to one another. Each pair includes a guided rail connected to the vehicle seat and a guiding rail co-operating therewith and secured to the vehicle floor. Such slide rail assemblies have been proposed in various constructional forms. These previously proposed slide rail assemblies are costly to manufacture since the rails of each pair are of different cross-section. Moreover, with such proposed assemblies there is the risl of the two rails becoming disengaged from one another especially during the occurrence of a driving accident which produces an uncontrolled movement of the vehicle seat.

The object of the invention is to provide an improved guide rail assembly.

It is a further object of the invention to overcome the disadvantages of the prior art by making the slide rail guides less expensive and more stable so that even the inertia forces arising during a road accident are not usually sufficient to release the interengaging rails of the slide rail assembly from one another.

SUMMARY OF THE INVENTION

According to the invention, there is provided a slide rail assembly for a vehicle seat comprising two pairs of guide rails arranged in spaced parallel relationship, the two rails of each pair being in sliding engagement with one another, one rail of each pair being arranged to be connected to a vehicle seat and to act as a guided rail, the other rail of each pair being arranged to be connected to the vehicle floor and to act as a guiding rail, the guiding rail and the guided rail of each pair being of similar cross-sectional shape, and having a U-shaped portion and a flanged portion, the flanged portion of the guiding rail engaging in the U-shaped portion of the guided rail and the flanged portion of the guided rail engaging in the U-shaped portion of the guiding rail.

According to the invention, there is further provided a guide rail assembly comprising two elongate guide rails of similar cross-section, each guide rail having a U-shaped portion and a flanged portion extending away from the free end of one leg of the U-shaped portion, one rail having its U-shaped portion inverted and its flanged portion depending downwardly therefrom, the other rail having its U-shaped portion engaged by said downwardly depending flange portion and its flanged portion extending upwardly into engagement with said inverted U-shaped portion, whereby the two rails are constrained for relative longitudinal movement.

BRIEF DESCRIPTION OF THE DRAWINGS

Slide rail assemblies embodying the invention will now be described, by way of example, with reference to the accompanying diagrammatic drawings in which.

DESCRIPTION OF THE PREFERRED EMBODIMENTS

Figure 1:
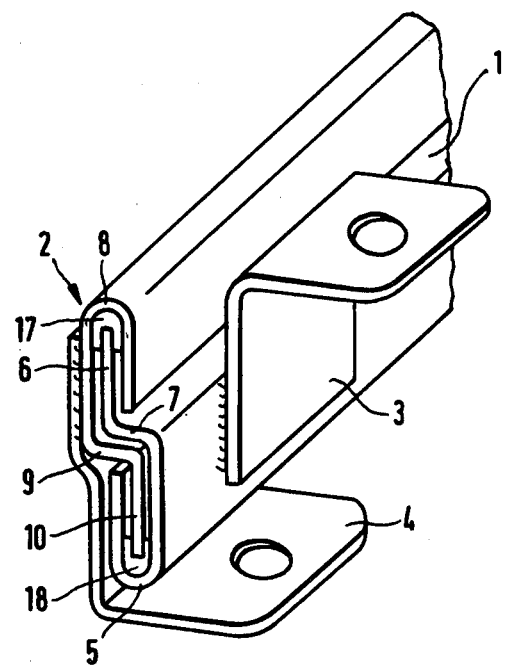
FIG. 1 is a perspective view of a slid rail assembly of a vehicle seat.

The slide rail assembly shown in FIG. 1 has two mutually parallel slide rail pairs (only a single pair being shown). Each slide rail pair consists of a guided rail 1 and a guiding rail 2. A vehicle seat (not shown) is directly or indirectly secured to the guided rail 1. For an indirect securing, plates 3 are provided on each rail 1, which plates are secured to the vehicle seat, for example by a bolt, by a rivet or by a welded connection.

Each guiding rail 2 is directly or indirectly mounted on the vehicle floor. Indirect mounting is effected by angled plates 4, rigid with each guiding rail 2 which plates are secured to the vehicle floor by a weld, bolt or rivet.

Each guided rail 1 has a lower portion or zone 5 of U-shape cross-section, an upper portion or zone in the form of an upstanding flange 6 and an intermediate portion or zone 7 interconnecting the upper and lower zones in an offset relationship to one another.

Each guiding rail 2 has an upper zone 8 of inverted U-shape cross-section, a lower zone in the form of a downwardly depending flange 10 and an intermediate zone 9 interconnecting the upper and lower zones in offset relationship with one another.

As the drawing clearly shows, the guiding rail 2 and the guided rail 1 both have the same cross-sectional configuration. It will be appreciated therefore that both rails can be taken from the same profile stock and that stocks of different rails are not needed.

It will also be appreciated that because the flange 6 of the guided rail 1 engages the U-shaped upper zone 8 of the guiding rail 2 and because the flange 10 of the guiding rail engages the U-shaped lower zone 5 of the guided rail 1 a double interlocking is achieved. This double interlocking even when subject to very high stresses, for example during road accidents, will prevent the release of the two rails 1 and 2 from one another.

Figure 2:
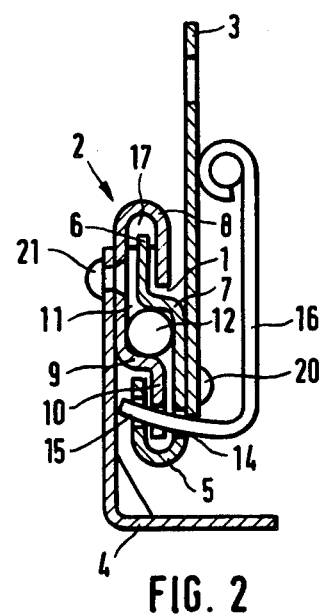
FIG. 2 is a cross-section through another form of a slide rail assembly.
Figure 3:
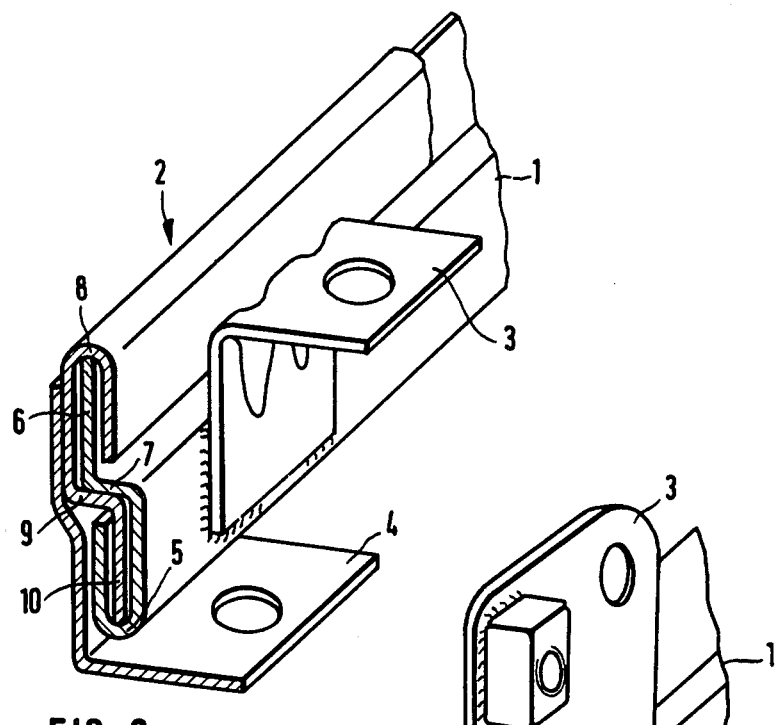
FIG. 3 is a perspective view, part cut away, of a third form of a slide rail assembly.
Figure 4:
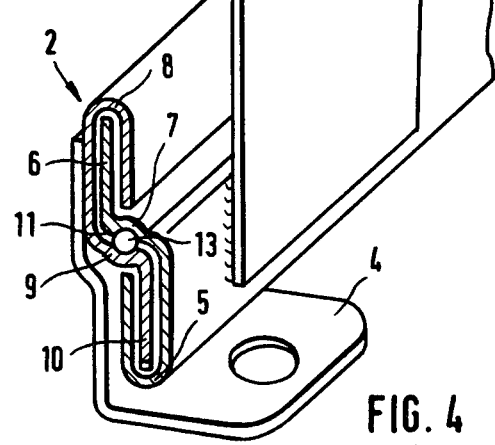
FIG. 4 is a perspective view, part cut away, of a fourth form of a slide rail assembly.

In the forms of guide rail assembly shown in FIGS. 2 to 5 parts similar to those in FIG. 1 are similarly referenced. In the assemblies of FIGS. 2 and 4 the offset zones 7 and 9 define an intermediate space 11. In the assembly of FIG. 2 this intermediate space 11 accommodates rolling bodies in the form of rolling ball bearings 12, mounted in a cage (not shown). Other forms of roller body construction can be used instead.

In FIG. 4 the intermediate space 11 accommodates a round cord 13 of elastic or resilient material, for example of synthetic resin or rubber to aid sliding.

In the assembly shown in FIG. 2 a latch 16 is pivotally secured to a plate 3 rigid with the guided rail 7. The latch 16 has a finger arranged to engage aligned openings 14 and 15 in the two walls of the U-shaped lower zone 5. A series of openings are provided in the lower flange 10 of the guiding rail 2 which can be engaged by the finger when aligned with the openings 14 and 15. In this way the rails of the guide assembly can be locked in different longitudinal positions.

As shown in FIG. 1, members 17 and 18 of elastic material are provided in respective U-shaped zones of the two rails. Each member 17 and 18 is slidingly engaged by a respective one of the two flanges 6 and 10.

In the assembly shown in FIG. 2 only a single member 17 of elastic material is provided and that in the guide 2.

Figure 5:
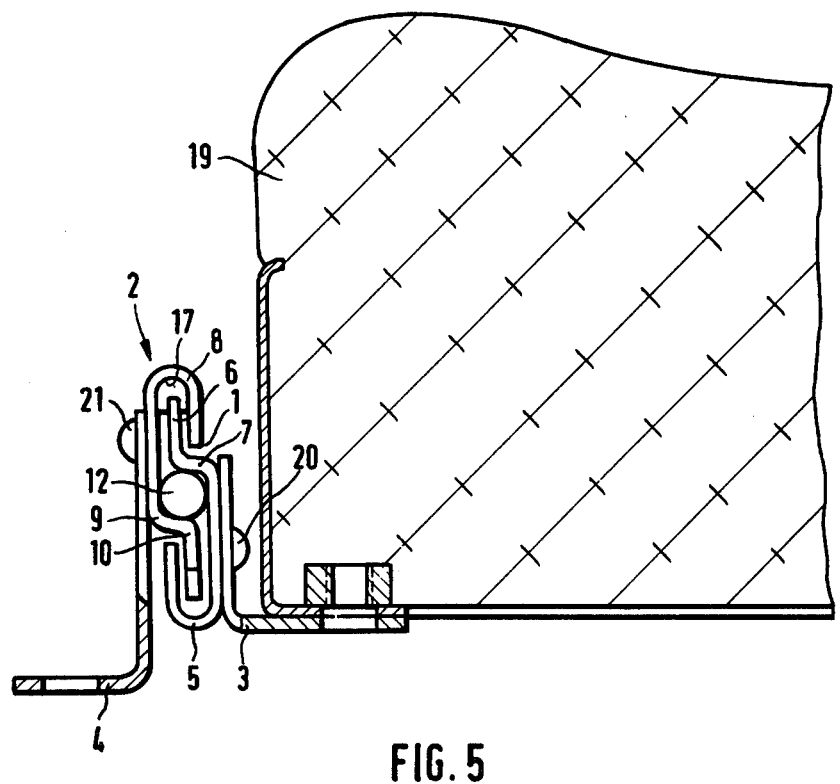
FIG. 5 is a cross-section through a fifth form of a slide rail assembly.

In the assembly shown in FIG. 5 the guided rail 1 is secured to the vehicle seat 19 and the guiding rail 2 is mounted indirectly on the vehicle floor by means not shown. Plates 4 are mounted on the upper U-shaped zone 5 of the guiding rail 2 while cover plates 3 are mounted on the lower U-shaped zone 5 of the guided rail 2. The connection of the cover plate 3 to the zone 5 of the guided rail 1 is a rivet connection 20. The connection of the plate 4 to the zone 8 of the guiding rail 2 is a rivet connection 21.

By choosing the rivet connection, screw mounting lugs and locking devices can be avoided.

With previously proposed slide rail guides special screw-receiving lugs and locking devices are welded to the guide rails. Such welds tend to deform the guide rails and impair the running qualities. Thus rattling and/or rough running occurs. The rivet connection described above avoids these difficulties.

In a modification both connections are screw connections. In spite of the relatively large height of the two rails 1 and 2 the location of the vehicle seat between the two pairs of rails can, with the aid of the plates 3,4 be made to be relatively low. Also because of the slim construction of the slide rail assemblies the assemblies can be located laterally of the seat.

Many modifications can be made to the invention withhout departing from the spirit and scope of the invention as defined by the appended claims.

I Claim:

1. A guide rail assembly comprising
two parallel guide rails of similar cross-section, each guide rail having
a two legged U-shaped portion defining a relatively deep recess, and
a flanged portion extending away from the free end of one leg of the U-shaped portion, said flanged portion extending parallel to but offset from said one leg, one rail having its U-shaped portion inverted and its flanged portion depending downwardly therefrom, the other rail having the recess of its U-shaped portion engaged by said downwardly depending flanged portion and its flanged portion extending upwardly into engagement with the recess defined by said inverted U-shaped portion, whereby the two rails are constrained for relative longitudinal movement only.

2. In a vehicle having a vehicle floor and a vehicle seat, a slide rail assembly for slidably supporting the vehicle seat on the floor, the assembly comprising
two pairs of guide rails arranged in spaced parallel relationship, the two rails of each pair being in sliding engagement with one another, one rail of each pair being arranged to be connected to a vehicle seat and to act as a guiding rail, the guiding rail and the guided rail of each pair being of similar cross-sectional shape, and having
a relatively deep U-shaped portion,
a flanged portion of the guiding rail engaging the U-shaped portion of the guided rail and the flanged portion of the guided rail engaging the U-shaped portion of the guiding rail, and
an intermediate portion connecting the U-shaped portion and the flanged portion so that the U-shaped portion lies offset from the flanged portion.

3. An assembly according to claim 2, wherein the two intermediate portions lie one above the other.

4. An assembly according to claim 3, including an elongate member of resilient material and having a circular cross-section accommodated between the two intermediate portions.

5. An assembly according to claim 3, including ball bearings accommodated between the two intermediate portions.

6. An assembly according to claim 2, wherein the U-shaped portion of one rail defines an opening, and the flange portion of the other rail defines a plurality of openings, and including a latch arranged to engage the opening in said one rail and any opening in the flange which is aligned with said one opening whereby to lock the two rails against relative longitudinal displacement.

7. An assembly according to claim 2, including a member of resilient material located between the flange portion of one rail and the U-shaped portion of the other rail.

8. An assembly according to claim 2,
including plates secured to the U-shaped portion of each guided rail to secure each guided rail to the vehicle seat, and
including plates secured to the U-shaped portion of each guiding rail to secure each guiding rail to the vehicle floor.

9. An assembly according to claim 8, wherein the plates are secured to the rails by rivet connections.

* * * * *